US012502100B2

(12) United States Patent
Ward et al.

(10) Patent No.: US 12,502,100 B2
(45) Date of Patent: Dec. 23, 2025

(54) SYSTEM AND METHOD FOR DETERMINING OPTIMAL ANGLE FOR A FOOT

(71) Applicants: Eric Ward, Aspen, CO (US); Keith Clark, Oklahoma City, OK (US)

(72) Inventors: Eric Ward, Aspen, CO (US); Keith Clark, Oklahoma City, OK (US)

( * ) Notice: Subject to any disclaimer, the term of this patent is extended or adjusted under 35 U.S.C. 154(b) by 223 days.

(21) Appl. No.: 17/060,967

(22) Filed: Oct. 1, 2020

(65) Prior Publication Data
US 2021/0093229 A1 Apr. 1, 2021

Related U.S. Application Data

(60) Provisional application No. 62/909,015, filed on Oct. 1, 2019.

(51) Int. Cl.
A61B 5/11 (2006.01)
A61B 5/00 (2006.01)
A61B 5/103 (2006.01)
A61F 5/14 (2022.01)

(52) U.S. Cl.
CPC .......... A61B 5/1121 (2013.01); A61B 5/0051 (2013.01); A61B 5/0057 (2013.01); A61B 5/1036 (2013.01); A61B 5/1107 (2013.01); A61F 5/14 (2013.01); A61B 2560/0266 (2013.01)

(58) Field of Classification Search
CPC ... A61B 5/1121; A61B 5/0051; A61B 5/1036; A61B 5/0057; A61B 5/1107; A61B 2560/0266; A61B 5/0077; A61B 2562/0219; A61B 5/1071; A61B 5/1114; A61B 5/1127; A61B 5/4538; A61F 5/14
See application file for complete search history.

(56) References Cited

U.S. PATENT DOCUMENTS

| 5,168,634 | A | 12/1992 | Misevich |
| 6,219,929 | B1 | 4/2001 | Tasker et al. |
| 7,069,665 | B1 | 7/2006 | Adriano |
| 9,038,482 | B2 | 5/2015 | Xia et al. |
| 10,136,703 | B2 | 11/2018 | Gooch et al. |
| 2006/0277772 | A1 | 12/2006 | Pupko |
| 2009/0124938 | A1* | 5/2009 | Brunner ............... A61B 5/1038 600/595 |
| 2009/0234254 | A1* | 9/2009 | Bar-Haim ............ A61B 5/6807 601/29 |

(Continued)

FOREIGN PATENT DOCUMENTS

WO WO 84/02304 6/1984

Primary Examiner — Jennifer Robertson
Assistant Examiner — Nidhi N Patel
(74) Attorney, Agent, or Firm — DUNLAP CODDING, P.C.

(57) ABSTRACT

An assembly and a method is described. The assembly includes a platform, a motive source, a sensor, a controller and a computerized system. The computerized system has logic configured to cause a processor to send a signal to the controller to cause the motive source to move the platform through at least a portion of a range of inclination angles and to receive data indicating at least one of muscle activity, movement, and ground reaction force applied to the platform at a determined angle, and to cause the processor to analyze the data to determine an orthotic angle for a user's foot.

20 Claims, 6 Drawing Sheets

(56) References Cited

U.S. PATENT DOCUMENTS

2010/0058855 A1    3/2010  Tadin et al.
2011/0175736 A1*  7/2011  Shieh .................. A61B 5/4023
                                                        340/573.1
2011/0256983 A1*  10/2011  Malack ............. A63B 21/4015
                                                        482/4

* cited by examiner

SYSTEM AND METHOD FOR DETERMINING OPTIMAL ANGLE FOR A FOOT

INCORPORATION BY REFERENCE

The present patent application claims priority to the provisional patent application identified by U.S. Ser. No. 62/909,015, the entire content of which is hereby incorporated herein by reference.

BACKGROUND OF THE DISCLOSURE

From a simplistic point of view the bipedal motion of walking is akin to the motion of a pendulum. A pendulum is a device that transforms kinetic energy of motion into potential energy, and then back into kinetic energy. As the pendulum moves through the bottom of its arc, the pendulum's velocity and thus its kinetic energy reaches a maximum. Thereafter that kinetic energy is converted back to potential energy as the pendulum comes to rest at its peak. With each step the human body is literally an inverted pendulum. But while a pendulum is incredibly efficient, the human body has some inconsistencies. One such instance is when that pendulum, i.e. the foot, is not naturally aligned to the "man-made" flat ground.

An individual standing upright on two feet is a very stable, static structure. The structure that is formed between the legs (two bases of support), hip girdle (the cross beam), and finally the torso (the third pillar) is a very stable geometric structure. The transverse extension of each foot with respect to the geometric plane formed by the two legs further stabilizes the structure. Indeed, an individual standing still with their legs shoulder width apart represents a very stable and strong static structure.

In such a configuration, the foot, knee, and hip which are aligned have its load-bearing axis on a line running down the middle of the leg, through the hip, knee, and ankle. In a static configuration, this line exists in what is referred to as the coronal or frontal plane. The coronal plane divides the body lengthwise, anterior from posterior, such that the face is separated from the back of the head, the chest from the back, the palms from the back of the hands, and the shins from the calves. But when walking, the body performs a pendulum motion about the sagittal plane. The sagittal plane bisects the left and right sides of the body longitudinally. This plane runs down the center of the head, torso, and between the legs and feet.

As an individual walks or runs, the neuro-muscular control system (the proprioceptive system), controls the bones, brain, and muscles in real time to maintain a balanced movement of the center of gravity, by shifting weight from one side of the sagittal plane to the other. In essence, when you walk (or run) you lean on and balance on one of your bases of support, while repositioning the other. The problem lies in the fact that the ender of each pendulums are not perfect nor symmetric. In fact, we will explain how each has natural measurable biases relative to flat ground.

In normal gait, the outside of the heel makes initial contact with the ground as an individual walks or runs. As the center of mass moves forward and the foot becomes fully weighted the foot rolls inward or pronates because of structural biases as it comes in complete contact with the ground (during midstance) where it can support the entire body weight effectively. The rolling in of the foot optimally distributes the forces of impact. This movement is critical to proper shock absorption and a functional amount of pronation, as defined herein, is required for the foot to function properly, relative to flat ground.

The opposite natural condition of the foot is called supination, it occurs as the outside of the heel makes initial contact with the ground and the normal inward movement of the foot occurs however it is not in the "functional range". So now instead of the muscles allowing the structural collapse the muscles need to intervene and control the structural collapse by firing a sustained tension to control the collapse thus creating an outward movement of the foot which is understood to be supination a natural muscular bias.

Consequently, forces of impact are concentrated on a smaller area of the foot (the outside part), and are not distributed as efficiently as with functional pronation.

Supination is the opposing range of motion to pronation and refers to the outward roll of the foot during normal bipedal motion. This movement is only possible through muscular intervention.

Pronation and supination, as they are classically understood, attempt to describe a complex simultaneous three-dimensional movement of the skeletal system within the foot and ankle. However, in this understanding there is no explanation as to the complex role or involvement of the neuromuscular system which originates in the foot. Other terms such as inversion vs. eversion, plantar flexion vs. dorsiflexion, and abduction vs. adduction describe various aspects of the complex task of bipedal motion. The dynamic interaction between the skeletal structure of the foot and proprioceptive, neuromuscular counterparts adds complexity. To simplify this Rubik's Cube a bit, pronation is a natural skeletal bias of the foot. This structural bias, is answered by its opposing muscular bias. Supination is thus the muscular over-reaction or over compensatory bias to a structural collapse. Moreover, while the musculature biases the foot toward supination the skeletal structure biases the foot to pronate. To efficiently and effectively achieve and maintain bipedal motion, a balance between the cyclical activities of both pronation and supination must occur. In this understanding of the foot dynamics, the more you structurally pronate, the more you muscularly supinate.

The harmony of the skeletal and neuro-muscular systems involved in walking and running is impeded when proper foot, ankle, and knee alignment is not maintained. Unlike the very stable structure of an individual standing still with their legs spread, walking and running is inherently unstable and any misalignment of the mechanical components requires constant muscular compensation every step of the way. The compensation requires energy and reduces overall endurance. Lastly, misalignment can ultimately result in overuse injuries and is the trigger mechanism to many chronic pain symptoms.

There are many orthotic devices and supplemental foot-beds designed to modify and correct misalignment of the knee, ankle and foot. Each, however, fails to consider the complexity or the dynamic nature of bipedal motion. Further, methods of gathering data with regards to the interaction of a person's foot and the ground reaction forces have been subjective. For example, foot, ankle, and knee alignment have been observed by a person in an attempt to determine the correct orthotic for an individual. However, determination of an orthotic angle using this subjective method is subject to human error by both the user and the observer. These and other deficiencies of the prior art are addressed by one or more embodiments of the present disclosure.

BRIEF DESCRIPTION OF THE DRAWINGS

The aforementioned and other features and objects of the present disclosure and the manner of attaining them will become more apparent, and the disclosure itself will be understood, by reference to the following description of one or more embodiments taken in conjunction with the accompanying drawings, wherein.

Figure 1:
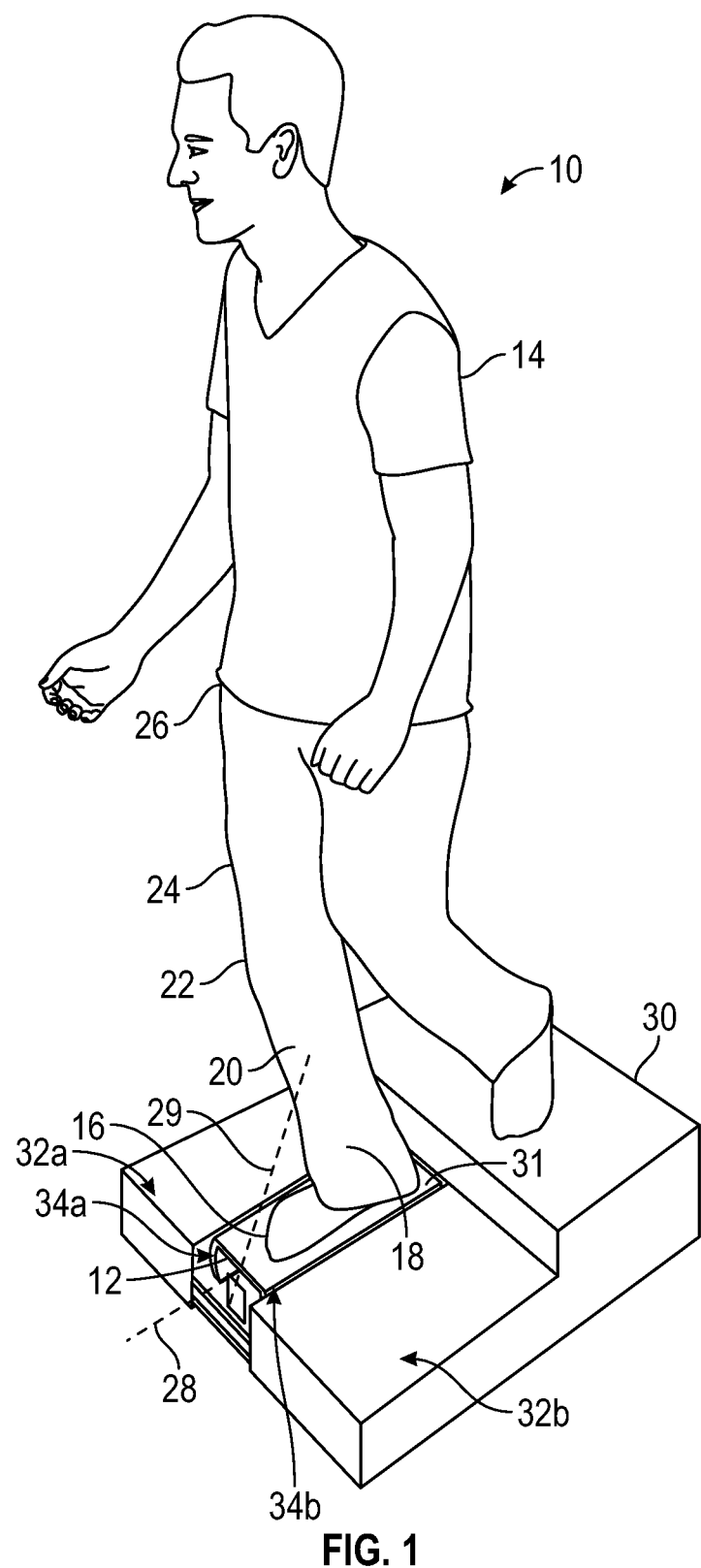
FIG. 1 illustrates a person standing on an angularly stable data collection system constructed in accordance with one embodiment of the presently disclosed inventive concepts.

The Figures depict embodiments of the present disclosure for purposes of illustration only. One skilled in the art will readily recognize from the following discussion that alternative embodiments of the structures and methods illustrated herein may be employed without departing from the principles of the disclosure described herein.

DESCRIPTION OF THE DISCLOSURE

Embodiments of the present disclosure are hereafter described in detail with reference to the accompanying Figures. Although the disclosure has been described and illustrated with a certain degree of particularity, it is understood that the present disclosure has been made only by way of example and that numerous changes in the combination and arrangement of parts can be resorted to by those skilled in the art without departing from the spirit and scope of the disclosure.

The following description with reference to the accompanying drawings is provided to assist in a comprehensive understanding of exemplary embodiments of the present disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. Also, descriptions of well-known functions and constructions are omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure are provided for illustration purpose only and not for the purpose of limiting the disclosure as defined by the appended claims and their equivalents.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

As used herein, all numerical values or ranges (e.g., in units of length such as micrometers or millimeters) include fractions of the values and integers within such ranges and fractions of the integers within such ranges unless the context clearly indicates otherwise. Thus, to illustrate, reference to a numerical range, such as 1-10 includes 1, 2, 3, 4, 5, 6, 7, 8, 9, 10, as well as 1.1, 1.2, 1.3, 1.4, 1.5, etc., and so forth. Reference to a range of 1-50 therefore includes 1, 2, 3, 4, 5, 6, 7, 8, 9, 10, 11, 12, 13, 14, 15, 16, 17, 18, 19, 20, etc., up to and including 50, as well as 1.1, 1.2, 1.3, 1.4, 1.5, etc., 2.1, 2.2, 2.3, 2.4, 2.5, etc., and so forth. Reference to a series of ranges includes ranges which combine the values of the boundaries of different ranges within the series. Thus, to illustrate reference to a series of ranges, for example, of 1-10, 10-20, 20-30, 30-40, 40-50, 50-60, 60-75, 75-100, 100-150, 150-200, 200-250, 250-300, 300-400, 400-500, 500-750, 750-1,000, includes ranges of 1-20, 10-50, 50-100, 100-500, and 500-1,000, for example.

The use of the word "a" or "an" when used in conjunction with the term "comprising" in the claims and/or the specification may mean "one," but it is also consistent with the meaning of "one or more," "at least one," and "one or more than one." The use of the term "or" in the specification or claims is used to mean "and/or" unless explicitly indicated to refer to alternatives only or when the alternatives are mutually exclusive, although the disclosure supports a definition that refers to only alternatives and "and/or." The use of the term "at least one" will be understood to include one as well as any quantity more than one, including but not limited to, 2, 3, 4, 5, 6, 7, 8, 9, 10, 15, 20, 30, 40, 50, 100, or any integer inclusive therein. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y and Z" will be understood to include X alone, Y alone, and Z alone, as well as any combination of X, Y and Z.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

If pronation is structural and supination is a muscular response, then optimizing the angle of the foot relative to the ground to control the structural collapse reduces the use of specific muscles. And by doing this an optimal foot position will be maintained every time the foot meets a predictably flat world.

If pronation is triggered by a structural collapse, and supination requires muscular tension in response, then changing the angle of the ground relative to the foot controls and predicts the structural collapse and also controls and predicts the muscular tension response.

This basic hypothesis is the key into the subject of the pre-programmed biases of pronation and supination. This provides the opportunity to begin to understand the cyclical nature of balancing movements.

The predictability is derived from an assumption that wherever a person may roam, the world will ideally present itself as consistently "flat". Flat typically refers to man-made surfaces, such as roads, floors, stairs, and sidewalks. So depending on the geometry of your unique foot tripods, such tripods normally meet predictably flat surfaces. The geometry of your foot is also measurable at the foot's end of range of motion while upright and balancing on one foot. Leg stance is a fundamental human condition of mobility, and it is submitted that optimizing the relative angle between a bottom of the foot and a flat surface will reduce a multitude of painful symptoms that result from the bottom of the foot meeting a flat surface at an un-optimal angle.

One aspect of the present disclosure is a method for determining dynamic angular alignment of an individual's foot and leg. According to one embodiment of the present disclosure, as an individual balances on one foot, pressure, and movement of the foot and leg is measured using a myriad of different sensors to capture biometric data, while a platform which is fixed at any angle while being moved through an infinite of inclination angles. The intensity and duration of the activity of balancing efforts is collected measured, and analyzed at a plurality of different angles, which the platform creates. The angle at which the duration and intensity of the biometric data is determined to be its lowest is determined to be the optimal angle for a footbed to be constructed. In some embodiments, the footbed is constructed according to U.S. Pat. No. 8,893,397, the entirety of which is incorporated herein by reference. The footbed sets the angle between the bottom of the foot and a flat surface.

It should be noted that different orthotic angles between a bottom of the foot and a flat surface may be optimal for different purposes. For instance, the optimal orthotic angle for riding, standing, walking, and running are different. Therefore, when the term optimal orthotic angle is used herein it should be construed to mean the optimal orthotic angle for a given activity such as riding, standing, walking, or running.

Figure 2:
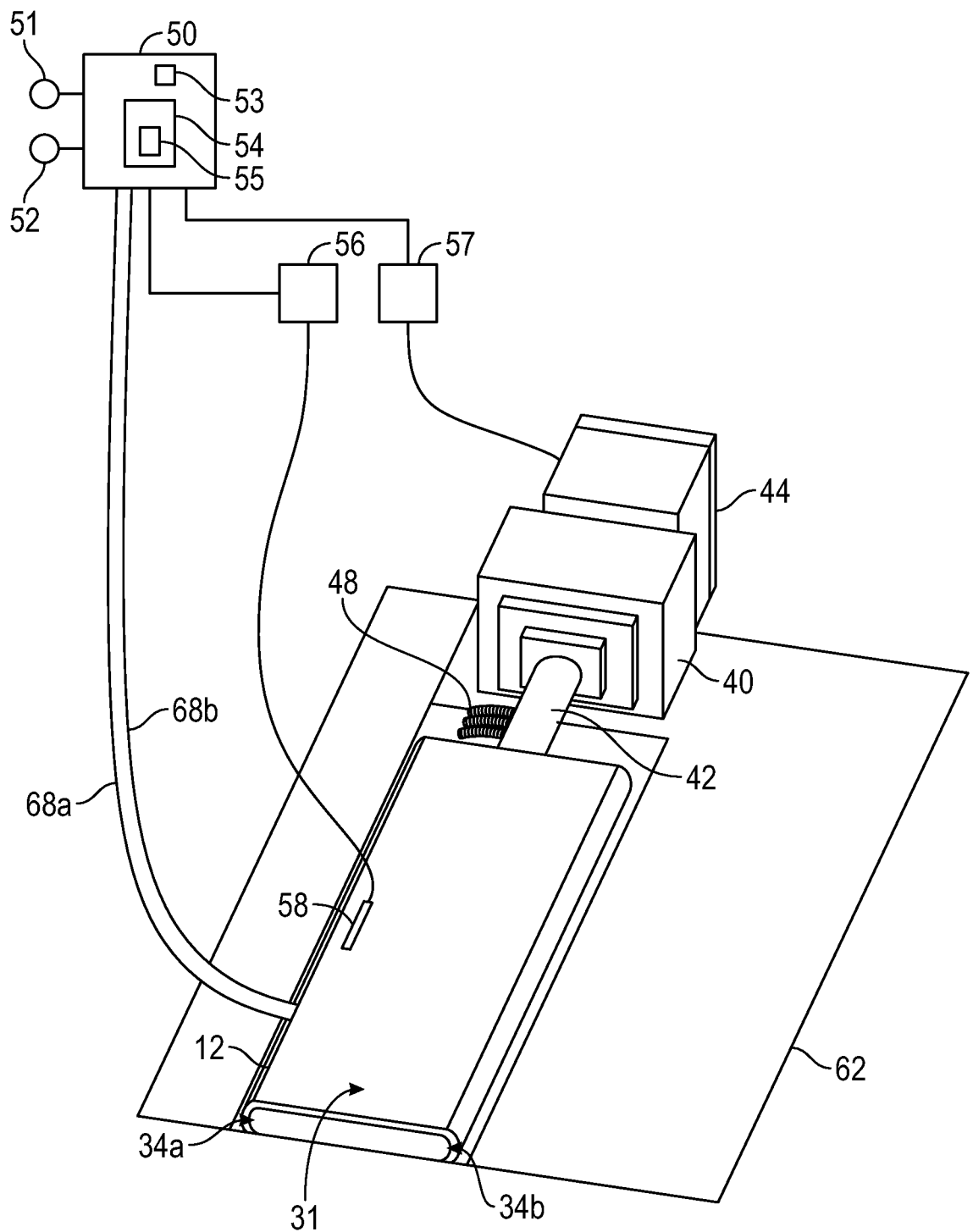
FIG. 2 illustrates the angularly stable data collection system of FIG. 1 with a cover removed.
Figure 3:
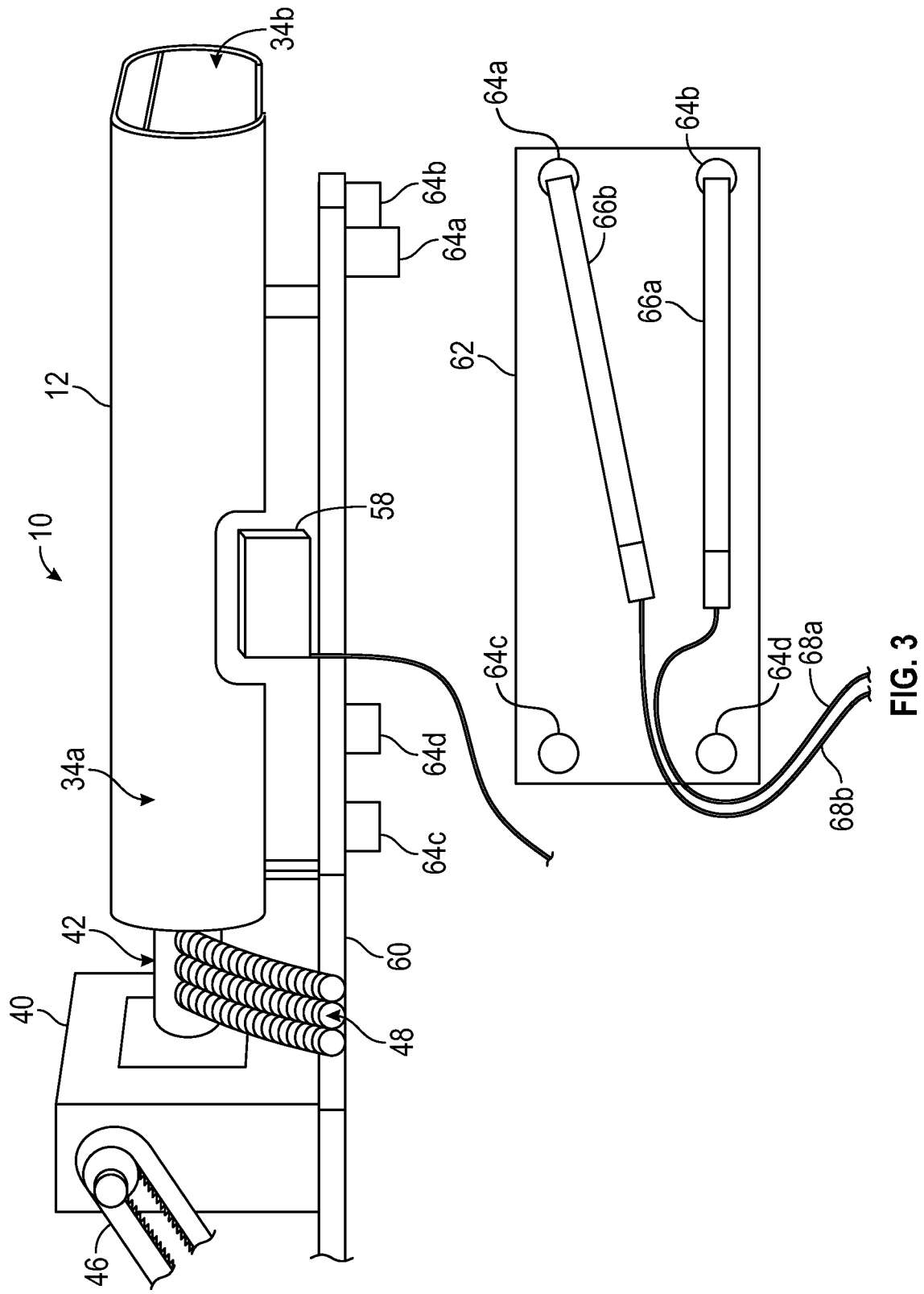
FIG. 3 illustrates a carrier having a motive source, gearbox, and platform attached thereon separated from a base of the angularly stable data collection system of FIG. 1.

Referring now to FIGS. 1-3, an adjustable, angularly stable data collection system 10 is shown in accordance with one embodiment of the present disclosure. The system 10 is provided with a platform 12 on which a user 14 balances on one foot 16. As the user 14 balances on the platform 12, a duration and intensity of muscular recruitment and overall skeletal movement is collected, measured, and analyzed. When the user's 14 foot 16, ankle 18, lower leg 20, knee 22, upper leg 24, and hip 26 are aligned, the intensity and duration of the muscular effort and biometrics of skeletal movements will be the lowest, or neutralized. To align the foot 16, ankle 18, lower leg 20, knee 22, upper leg 24, and hip 26, the platform 12 may be angularly adjusted, e.g., rotated on an X-axis 28. The platform 12 may be rotated to an infinite number of angular fixed positions around the X-axis 28 and dynamic balancing data may be collected and analyzed at a plurality of incremental degree changes to determine a dynamic balancing parameter. The dynamic balancing parameter can be measured by determining the intensity and duration of muscular activity through ground reaction forces and biometrics of certain movements of the user's 14 body during the testing process as discussed below. The platform 12 may be rotated around at least one of the X axis 28 and a Y axis 29, for instance, from +15 degrees to −15 degrees stopping at incremental degrees in between to perform a re-test. In some embodiments, testing and/or re-testing occurs until a final determination of the dynamic balancing parameter is made. In some embodiments, a manual override may be provided to retest specific angles at the user's request. Although the platform 12 will be described herein as being rotated or adjusted around X-axis 28, the platform 12 may also be rotated or adjusted around the Y axis 29 using the same data collecting abilities to find the optimal orthotic X and Y angle for each foot.

In the illustrated embodiment of the system 10, the X axis 28 is aligned with a longitudinal center of the platform 12.

A cover 30 may align with a top surface 31 of the platform 12 and gives the user 14 a place to stand before balancing on the platform 12. In addition, the cover 30 prevents access to some parts of the system 10 as will be illustrated further herein. In some embodiments, the top surface 31 of the platform 12 is flat.

The cover 30 may include a first foot rest 32a and a second foot rest 32b. The platform 12 may include a first side 34a and a second side 34b. The foot rest 32a is positioned adjacent to, but spaced from the first side 34a so as to permit the platform 12 to move arcuately, as discussed above. Likewise, the foot rest 32b is positioned adjacent to, but spaced from the second side 34b. The spacing between the platform 12, the first foot rest 32a and the second foot rest 32b may vary, but can be within a range of about ⅛ inch to about ¼ inch to permit the platform 12 to move arcuately, but prevent the user's toe(s) from being positioned between the platform 12 and the foot rests 32a and 32b. The first side 34a and the second side 34b may be arcuately shaped so as to maintain a substantially consistent spacing with the first foot rest 32a and the second foot rest 32b as the platform 12 is moved. In some embodiments, the foot rests 32a and 32b are stationary. The platform 12 may be constructed of a rigid material so as to substantially prevent deflection of the platform 12 due to supporting the weight of the user 14. For example, the platform 12 may be constructed of a metal or industrial polymer material. The platform 12 may not be created from a mesh or membrane material configured to deflect and follow the contours of a bottom of the user's 14 foot 16. Rather, in some embodiments, the top surface 31 of the platform 12 is flat, and remains flat as the platform 12 moves.

In FIG. 2, the system 10 is illustrated with the cover 30 removed. The platform 12 is operably coupled to a transmission 40 via coupler 42. A motive source 44, such as a stepper motor, is operably connected to the transmission 40 via a belt 46 (see FIG. 3) which drives the transmission 40. Springs 48 may be attached to the coupler 42 to prevent backlash as the motive source 44 drives the transmission 40 which moves the platform 12 around the X axis 28 (see FIG. 1).

The transmission 40 is geared such that the platform 12 is moved by the motive source 44 at an appropriate speed around the X axis 28, i.e., the user 14 is not thrown off balance by the movement of the platform 12. By way of example, the transmission 40 illustrated is geared at 60:1. However, as will be understood by a person of skill in the art, other gear ratios may be used depending on the speed of the motive source 44, desired speed of rotation of the platform 12, weight of the user 14, etc.

The transmission 40 can be driven in a forward and reverse direction by the motive source 44, but is configured to prevent the motive source 44 from being back-driven through its output gearing. In other words, when the platform 12 is rotated to a determined angle, the transmission 40 will not allow the platform 12 to rotate even with the weight of the user 14 on the platform 12. This way, the transmission 40 (in some embodiments) is not be required to provide input from the motive source 44 constantly to hold the platform 12 at determined angles. As will be appreciated by a person of skill in the art, this non back-drivability may be accomplished several different ways, for instance, the lower the gear ratio of the transmission, the less likely that the transmission will back-drive. Alternately, a worm gear driven transmission may be used, for instance. In some embodiments, a locking system may be employed that prevents movement when the transmission 40 is not being driven by the motive source 44. It should be understood that these variations are described for illustrative purposes only and any known or future method or apparatus for rotating and holding the platform 12 at a determined angle may be used. In some embodiments, the platform 12 is moved through a plurality of testing angles (one or more of which may be determined) and a dynamic balancing parameter is calculated at each of the testing angles. In some embodiments, the exact angle of each testing angle need not be known or determined. In these embodiments, an angle of one or more of the testing angles may be determined responsive to the dynamic balancing parameter indicating sufficient stability of the user 14. The determined angle may be determined before or after the dynamic balancing parameters have been analyzed to select a particular one of the testing angles that provide the user with sufficient stability.

The system 10 may be provided with a computer 50. The computer 50 may be provided with an input device 51, an output device 52, a processor 53 operably connected to a non-transitory computer readable memory 54 storing software 55 configured to cause the processor 53 to complete the functions described herein, such as measuring a dynamic balancing parameter while the user is balancing on the platform 12. The dynamic balancing parameter may be a quantitative measurement of how well the user 14 is dynamically balancing on the platform 12. By determining a dynamic balancing parameter for a variety of inclinations of the platform 12, the system 10 can measure the user's 14 orthotic angle for each foot 16. The inclination of the platform 12 resulting in the best dynamic balancing parameter for the foot 16 may be the user's 14 orthotic angle for the foot 16. The orthotic angle for each foot 16 can then be adjusted based on expected activity to develop the optimal orthotic angle for each foot 16. The dynamic balancing parameter can be measured in a number of ways, such as changes in force applied to the platform 12, vibration of the platform 12, changes in movement of the user's leg upon which the user 14 is balancing, or a biological change of the user 14, such as changes in calf or leg muscle activity or tension. Rotational evidence in postural accommodations to a changing world beneath the user 14 may be tested. Data collected may be in a time series, and the dynamic balancing parameter can be analyzed in a variety of ways. For example, the dynamic balancing parameter may be a standard deviation of the data.

The output device 52 may be capable of outputting information in a form perceivable by the user 14 and/or processor 53. For example, implementations of the output device 52 may include, but are not limited to, a computer monitor, a screen, a touchscreen, a speaker, a website, a television set, a smart phone, a PDA, a cell phone, a laptop computer, combinations thereof, and the like, for example. It is to be understood that in some exemplary embodiments, the computer 50, including the input device 51 and the output device 52 may be implemented as a single device, such as, for example, a touchscreen of a computer, a tablet, or a smartphone.

The processor 53 may be implemented as a single or plurality of processors working together, or independently, to execute the logic as described herein. Exemplary embodiments of the one or more processor 53 may include, but are not limited to, a digital signal processor (DSP), a central processing unit (CPU), a field programmable gate array (FPGA), a microprocessor, a multi-core processor, and/or combination thereof, for example. It is to be understood, that in certain embodiments, using more than one processor 53, the processors 53 may be located remotely from one another, in the same location, or comprising a unitary multi-core processor. The processor 53 is configured to create, manipulate, retrieve, alter, and/or store data structures into the non-transitory computer readable medium 96.

The non-transitory computer readable medium 54 may be implemented as a conventional non-transitory memory, such as, for example, random access memory (RAM), a CD-ROM, a hard drive, a solid state drive, a flash drive, a memory card, a DVD-ROM, a floppy disk, an optical drive, combinations thereof, and/or the like, for example.

In the example depicted in FIG. 2, the system 10 is configured to measure the force applied to the platform 12 while the user is dynamically balancing on the platform on one foot 12. The computer 50 may be operably connected to an analog to digital converter (ADC) 56 and a controller 57. The controller 57 may be operably connected to the motive source 44. The software 55 may send a signal to the processor 53 that causes the computer 50 to send a signal to the controller 57 to operate the motive source 44 to control the movement of the platform 12.

A position sensor 58, such as an inclinometer, may be connected to the platform 12 and operably connected to the computer 50 through the ADC 56 to send a signal to the computer 50 indicating an inclination of the platform 12. The position sensor 58, in some embodiments, may measure a rotational position of the platform 12. In some embodiments, the position sensor 58 may be a dual axis position sensor.

The system 10 may be provided with a carrier 60 that isolates the platform 12, transmission 40, and motive source 44 (not shown in FIG. 3). This way, all the force from the user 14 balancing on the platform 12 is transferred into a base 62 through legs 64a-64d. In the illustrated embodiment, at least two of the legs 64a-64d contact force sensors 66a and 66b which read the force transferred from the platform 12 through the legs 64a-64d and send a signal through wires 68a and 68b to the computer 50. It should be noted, however, that the signal from the force sensors 66a and 66b may be sent wirelessly to the computer 50, or passed to the computer 50 via the ADC 56. It should also be noted that only one of the force sensors 66 can be used to measure variations in force applied to the platform 12 while the user 14 is dynamically balancing on one leg.

In operation of the system 10, the position sensor 58 may send a signal to the computer 50 indicating the current position of the platform 12. In response, the computer 50 may send a signal to the controller 57 indicating that the controller 57 operates the motive source 44 to rotate the platform 12. When the platform 12 reaches the desired angle as indicated by a signal sent to the computer 50 from the position sensor 58 (or a pre-determined amount of rotational movement of the motive source 44), the computer 50 sends a signal to the controller 57 that causes the controller 57 to stop the motive source 44. In some embodiments, the motive source 44 may be a stepper motor, and the controller 57 transmits instructions to the motive source 44 indicative of a pre-determined number of steps to move the stepper motor a pre-determined rotational amount corresponding to a particular angle. Once the platform 12 reaches the determined angle, the software 55 may be programmed to then read signals received from at least one of the force sensors 66a and 66b indicating movement of the platform 12 generated by the user 14 statically balancing on the platform 12 on one leg. The data indicative of the determined angle(s) and the data from the at least one of the force sensors 66a and 66b may be stored in a dynamic balancing database, such as a table, relational database, or a graph-based database. The software 55 stored in memory 54 on computer 50 may be programmed to use the data from the at least one of the force sensors 66a and 66b to determine when the user's 14 foot 16, ankle 18, lower leg 20, knee 22, upper leg 24, and hip 26 are aligned. For instance, the software 55 may compare the signals at each angle of the platform 12 to determine when the least amount of force is being transferred onto the platform 12 indicating that the user 14 is most balanced which indicates that the user's 14 foot 16, ankle 18, lower leg 20, knee 22, upper leg 24, and hip 26 are aligned.

While the system 10 has been illustrated having at least two legs 64a and 64b contacting the force sensors 66a and 66b, it should be noted that in other embodiments, the system 10 may be provided with a carrier having only one leg 64 contacting a single force sensor 66 configured to read the force transferred from the platform 12 through the leg and send a signal to the computer 50.

In another embodiment, the system 10 may be programmed to continually read and calculate the intensity and duration of muscular activity through ground reaction forces and biometrics of certain movements of the user's 14 body during the testing process. For instance, the system 10 may rotate the platform 12 around the X axis 28 at a rate that will not cause the user 14 to lose their balance while continually collecting and analyzing dynamic balancing data at each incremental degree change to determine the dynamic balancing parameter. As the system 10 moves the platform 12 in an arcuate path (e.g. rotate) in one direction, the system 10 may determine when the user 14 changes from less stable to more stable and then back to less stable again. The system 10 may then cause the platform 12 to move (e.g., rotate) in the opposite direction until the system 10 determines that the user 14 is more stable on the platform 12 again. The system 10 may be programmed to cycle in this fashion several times to determine the angle at which the user 14 is most stable. Once the angle (optimal angle) at which the user 14 is most stable has been determined, a footbed can be created in accordance with the optimal angle for the user's foot. In some embodiments, at least one footbed can be selected in accordance with the optimal angle for the user's 14 foot 16, from a plurality of footbeds, with each footbed having a known orthotic angle. Exemplary footbeds, and techniques for creating a footbed are disclosed in U.S. Pat. No. 8,893, 397, the entire content of which has been incorporated by reference.

Figure 4:
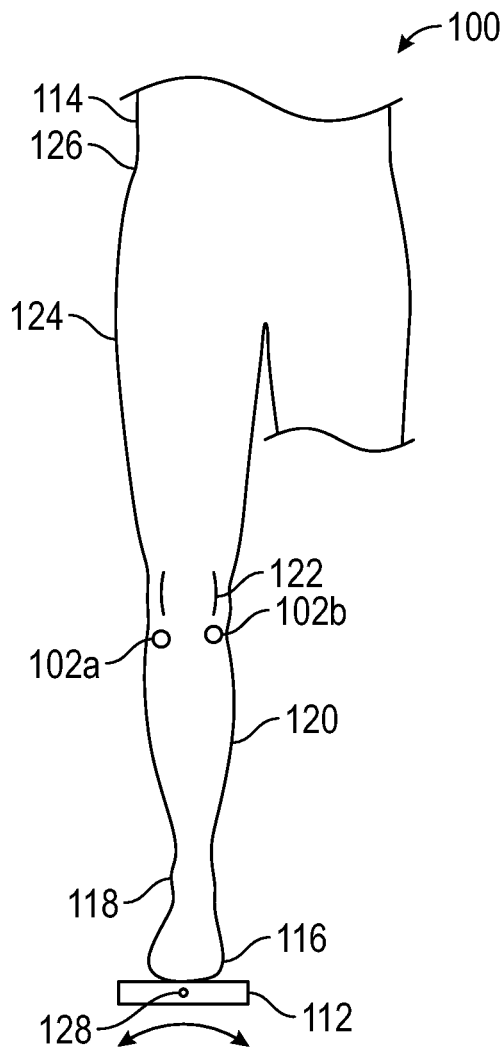
FIG. 4 illustrates a person having EMG electrodes placed on the lower leg muscle groups standing on an angularly stable data collection system constructed in accordance with another embodiment of the presently disclosed inventive concepts.

Biomedical signals refer to electrical signals acquired from a body part, such as an organ or a muscle, that represents a physical variable of interest. This signal is normally a function of time and is describable in terms of its amplitude, frequency, and phase. When a muscle contracts, the muscle produces an electrical signal. These electrical signals can be read using what is referred to as electromyography (EMG). Referring now to FIG. 4, in one embodiment, a system 100 for angular stability data collection may be provided with EMG electrodes 102a and 102b which may be placed on muscles of a lower leg 120 of a user 114 to read the amplitude, frequency, or phase of the electrical signals of the muscles of the lower leg 120. The system 100 is similar to system 10, therefore, in the interest of brevity, only the differences between the system 100 and the system 10 will be described in detail herein.

In such an embodiment, the system 100 angularly moves a platform 112 around at least one axis 128 and through a series of predetermined angles. The platform 112 can be stopped at each predetermined angle, or be moved at a speed sufficiently slow to avoid unbalancing the user. In either case, the system 100 measures the electrical signals of the lower leg 120 of the user 114. The system 100 measures the electrical signals of the lower leg 120 using the EMG electrodes 102a and 102b as the platform 112 is at a plurality of determined angles to obtain data indicative of the dynamic balancing parameter. The system 100 may detect the alignment of the user's 114 foot 116, ankle 118, lower leg 120, knee 122, upper leg 124, and hip 126 by determining when the muscles of the lower leg 120 of the user 114 are least active indicating the user 114 is most balanced.

Figure 5:
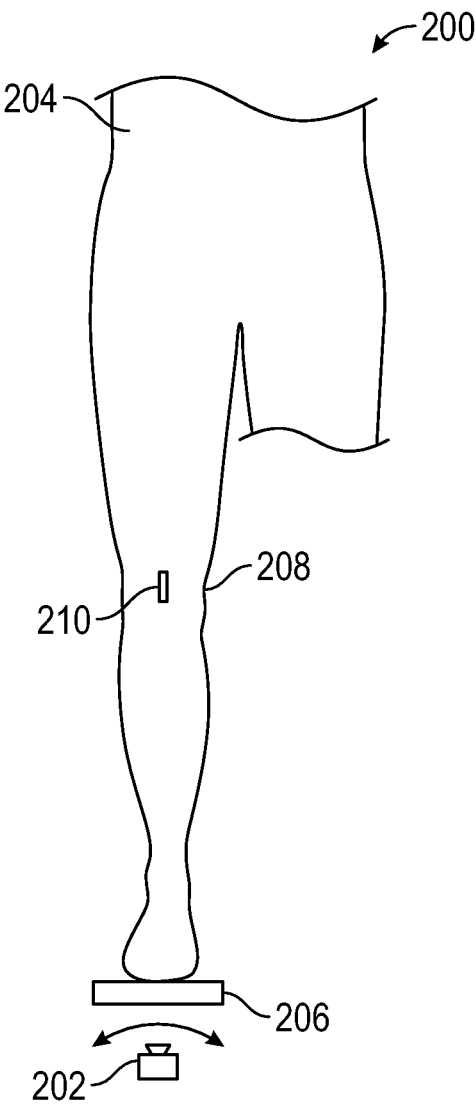
FIG. 5 illustrates a person standing on an angularly stable data collection system constructed in accordance with another embodiment of the presently disclosed inventive concepts.

Referring now to FIG. 5, a system 200 for angularly stabile data collection is illustrated. The system 200 is similar to system 10, therefore, in the interest of brevity, only the differences between the system 200 and the system 10 will be described in detail herein. The system 200 may be provided with a camera 202. As a user 204 balances on a platform 206, the camera 202 may capture a sequence of images of a knee 208 (or leg, e.g., foot, ankle, lower leg, knee, upper leg, and hip) of the user 204. As the platform 206 is rotated as described above, a mark 210 on the knee 208 of the user 204 may be visualized in successive frames to determine changes in the movement of the knee 208 as the user 204 balances on the platform 206. Images captured by the camera 202 as the platform 206 is rotated to predetermined angles may be compared to determine at which angle the knee 208 moves the least indicating the user 204 is most stable. Movement of the mark 210 can be determined using any suitable measurement technique. For example, the camera 202 may be stationary, so any differences between the locations of the mark 210 within the sequence of images will be attributable to movement of the knee 208 of the user 204. In this case, movement can be determined by scanning the images in a horizontal manner and determining a number of pixels where the mark 210 is located relative to a reference point. In this manner, the movement of the knee 208 can be plotted over time, and the plot analyzed to determine an amount of movement of the knee 208, resulting in the dynamic balancing parameter for each angle.

Figure 6:
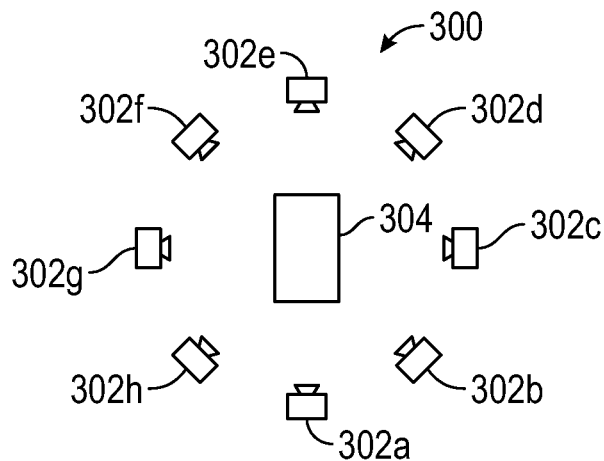
FIG. 6 illustrates a platform surrounded by a camera or cameras of another angularly stable data collection system constructed in accordance with the presently disclosed inventive concepts.

Referring now to FIG. 6, a system 300 for angularly stabile data collection is illustrated. The system 300 is similar to system 10, therefore, in the interest of brevity, only the differences between the system 300 and the system 10 will be described in detail herein. The system 300 may be provided with a plurality of cameras 302a-302h positioned around a platform 304. The cameras 302a-302h may capture images of a user (not shown) balancing on the platform 304 as described above. The images may be processed by a computer (not shown) using triangulation techniques known in the art to produce a 3D model of a leg of the user. The 3D model may be used to determine when a foot, ankle, lower leg, knee, upper leg, and hip of the user are aligned at a predetermined angle or to measure movement of the 3D model over time. The movement of the 3D model may be determined by a decision making process running on the computer at each angle of the platform 304 to determine an angle at which a minimum of movement occurs thereby indicating when a foot, ankle, lower leg, knee, upper leg, and hip of the user are aligned.

It should be noted that while the system 300 is illustrated having a plurality of cameras capturing images of the user, in other embodiments, the system 300 may be provided with other methods of creating three-dimensional scans of the user. For instance, a single camera that moves around the user capturing images, a light detecting and ranging (LiDAR) system, laser triangulation, structured light 3D scanning, contact based 3D scanning, laser pulse (time of flight) scanning, etc., may be used.

Figure 7:
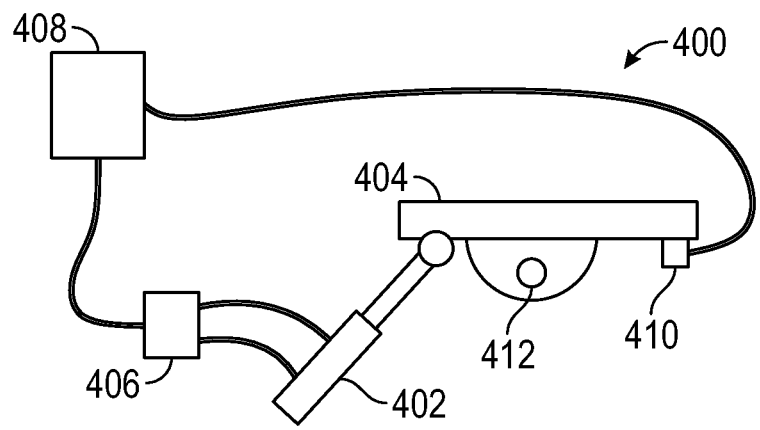
FIG. 7 illustrates an angularly stable data collection system having a platform angularly rotatable by a piston constructed in accordance with another embodiment of the presently disclosed inventive concepts.

Referring now to FIG. 7, an exemplary system 400 for angularly stabile data collection is illustrated. The system 400 is similar in operation to system 10, therefore, in the interest of brevity, only the differences between the system 400 and the system 10 will be described in detail herein. The system 400 is provided with a motive source, such as a piston 402 operably connected to a support, such as the base 704 described below, and the platform 404 which rotates around pivot point 412. The support, e.g., base 704, may not be movable relative to the platform 404 thereby translating movement of the piston 402 into movement of the platform 404. The piston 402 may be hydraulic or pneumatic and connected to pump 406 which provides hydraulic or pneumatic pressure to the piston 402. The pump 406 may be controlled by a computer 408 constructed and programmed as described above. The computer 408 receives signals from an angle sensor 410 indicating a rotational position of the platform 404. The computer 408 may be programmed to cause the pump 406 to cause the piston 402 to move the platform 404 to a predetermined angle as determined by the angle sensor 410 or a predetermined amount of movement. The system 400 may then use sensors as described above to measure the static balancing parameter for each angle, and thereby determine the optimal orthotic angle of a user.

Figure 8:
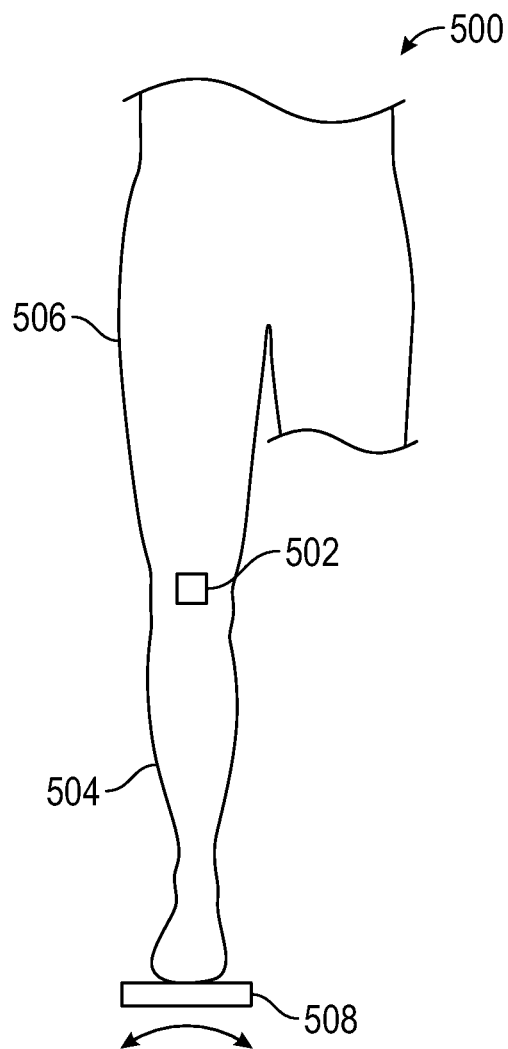
FIG. 8 illustrates a person having an accelerometer or multiple acceleromotors placed on a lower leg, upper leg, pelvis, torso, upper and lower arms, hands, or head, while standing on an angularly stable data collection system constructed in accordance with the presently disclosed inventive concepts.

Referring now to FIG. 8, an exemplary system 500 for angularly stabile data collection is illustrated. The system 500 is similar in operation to system 10, therefore, in the interest of brevity, only the differences between the system 500 and the system 10 will be described in detail herein. The system 500 may be provided with an accelerometer 502 attached to a body part, such as a lower leg 504 of a user 506. As a platform 508 is angularly moved as described above, movement of the lower leg 504 of the user 506 may be sensed and recorded by the accelerometer 502. The accelerometer 502 may be incorporated into a smart phone, for example having a processor running an application that calculates movement of the leg based upon the readings from the accelerometers 502. The smart phone, and thus the accelerometer 502, may be removably attached to the lower leg 504 via a strap, for example.

It should be noted that although the system 500 is illustrated having one accelerometer, in some embodiments the system 500 may be provided having more than one accelerometer. Further, one or more accelerometer 502 may be placed on the platform 508 to sense movement of the platform caused by the user 506. Further, the accelerometer may have more than one axis. In some embodiments, the accelerometer 502 includes three axes.

Figure 9:
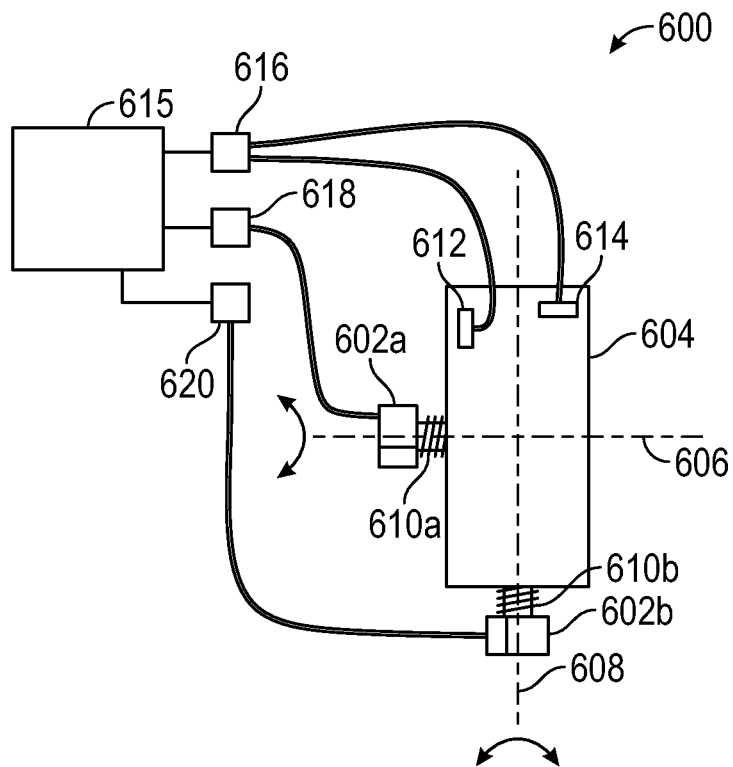
FIG. 9 illustrates an angularly stable data collection system having a platform angularly rotatable around two axes in accordance with another embodiment of the presently disclosed inventive concepts.

Referring now to FIG. 9, an exemplary system 600 for angularly stable data collection is illustrated. The system 600 is similar in operation to system 10, therefore, in the interest of brevity, only the differences between the system 600 and the system 10 will be described in detail herein. The system 600 is provided with at least two motive sources 602a and 602b operably connected to a platform 604 to move the platform 604 around a first axis 606 and a second axis 608. The motive sources 602a and 602b may be connected to the platform 604 with any suitable mechanical fixture, such as screws 610a an 610b, for instance. The system 600 may be provided with a first angle sensor 612 configured to determine a first rotational angle about the first axis 606 and a second angle sensor 614 configured to determine a second rotational angle about the second axis 608. The system 600 may be provided with a computer 615 connected to an ADC 616, a first controller 618 connected to the first motive source 602a, and a second controller 620 connected to the second motive source 602b. The computer 615 may cause the motive sources 602a and 602b to set the platform 604 at a predetermined angle, and then the movement of the user's leg as the user balances on one leg can be determined using any of the methodologies (force sensor(s), image(s), accelerometer(s), etc.) discussed above.

Figure 10:
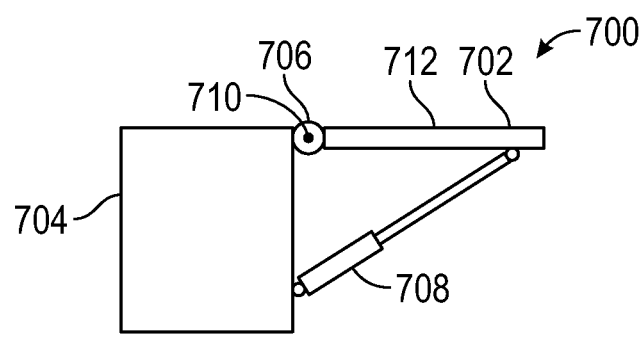
FIG. 10 illustrates an angularly stable data collection system having a platform that is hinged on one side in accordance with another embodiment of the presently disclosed inventive concepts.

Referring now to FIG. 10, an exemplary system 700 for angularly stable data collection is illustrated. The system 700 is similar in operation to system 10, therefore, in the interest of brevity, only the differences between the system 700 and the system 10 will be described in detail herein. The system 700 may be provided with a platform 702 that is moveably attached to a base 704 by a hinge 706. The platform 702 may be angularly adjusted by motive source 708 around hinge 706. The motive source 708 may be a solenoid connected to the base 704 and the platform 702. In the system 700, the platform 702 rotates around an axis 710 that is offset from a center 712 of the platform 702. The axis 710 can be an x-axis or a y-axis.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the scope and coverage of the inventive concepts disclosed and claimed herein.

What is claimed is:

1. An assembly, comprising:
a stationary base;
a platform supported by the stationary base, the platform having at least one axis and configured to move through a range of inclination angles around the at least one axis;
a motive source operably connected to the platform and configured to move the platform through at least a portion of the range of inclination angles;
at least one sensor adjacent to the platform and configured to generate first data indicative of a dynamic balancing parameter, the dynamic balancing parameter being a quantitative measurement of how well a user is dynamically balancing on the platform;
a controller operably connected to the motive source, the controller configured to operate the motive source to move the platform; and
a computerized system having a processor and a non-transitory computer readable memory storing logic, the logic configured to cause the processor to send a signal to the controller to cause the motive source to move the platform through at least a portion of the range of inclination angles during a period of time in which a user balances on one foot on the platform and to receive the first data from the at least one sensor and determine the dynamic balancing parameter for a plurality of the inclination angles by measuring at least one of muscle activity, movement, and ground reaction force applied to the platform at the plurality of inclination angles; and
wherein the logic is configured to cause the processor to measure an orthotic angle for the user's foot by analyzing the dynamic balancing parameters for the plurality of the inclination angles to determine an inclination angle of the platform that has a best dynamic balancing parameter, the inclination having the best dynamic balancing parameter being the orthotic angle for the user's foot.

2. The assembly of claim 1, wherein the first data is indicative of force applied to the platform.

3. The assembly of claim 1, wherein the first data is indicative of acceleration.

4. The assembly of claim 1, wherein the first data includes a series of images.

5. The assembly of claim 1, wherein the first data is analog data.

6. The assembly of claim 5, further comprising an analog to digital converter receiving the first data and converting the first data to second data, wherein the second data is digital data.

7. The assembly of claim 1, wherein the dynamic balancing parameter is a measurement of an amount of force being transferred onto the platform and the best balancing parameter is a balancing parameter when a least amount of force is being transferred onto the platform.

8. The assembly of claim 1, wherein the logic is configured to create a footbed in accordance with the orthotic angle for the user's foot.

9. The assembly of claim 1, wherein the logic is configured to select a footbed in accordance with the orthotic angle for the user's foot.

10. A method, comprising:
moving a platform supported by a stationary base through a series of inclination angles by a motive source operably connected to the platform;
obtaining, via a sensor located adjacent to the platform, data indicative of a user dynamically balancing on the platform on one foot at a plurality of the inclination angles;
determining, by a computerized system having a processor and a non-transitory computer readable medium storing logic, dynamic balancing parameters for the user's foot at the inclination angles by measuring at least one of muscle activity, movement and ground reaction force applied to the platform at the inclination angles, the dynamic balancing parameters being a quantitative measurement of how well a user is dynamically balancing on the platform; and
objectively analyzing, by the processor, the dynamic balancing parameters to determine one of the inclination angles at which a least amount of force is being transferred onto the platform, the inclination at which the user is most balanced being an orthotic angle for the user's foot.

11. The method of claim 10, wherein moving the platform through the series of testing angles includes stopping the platform for a period of time at each of the plurality of inclination angles; and wherein obtaining data from the sensor indicative of the user dynamically balancing is obtained when the platform is stopped.

12. The method of claim 10, wherein the sensor is a force sensor, and the data is indicative of force applied to the platform by the user.

13. The method of claim 10, wherein the sensor is an accelerometer, and the data is indicative of vibration of the platform.

14. The method of claim 10, wherein moving the platform through the series of inclination angles includes moving the platform continuously and obtaining data from the sensor indicative of the user dynamically balancing when the platform is in motion.

15. The method of claim 10, wherein the platform has an x-axis and a y-axis, and wherein moving the platform through the series of testing angles is defined further as moving the platform along at least one of the x-axis and the y-axis.

16. The method of claim 10, further comprising receiving information indicative of a predetermined activity, and adjusting the orthotic angle for the user's foot with an angular deviation based upon the predetermined activity.

17. The method of claim 10, further comprising the step of creating a footbed in accordance with the orthotic angle for the user's foot.

18. The method of claim 10, further comprising the step of selecting at least one footbed in accordance with the orthotic angle for the user's foot from a plurality of footbeds, with each footbed having a known orthotic angle.

19. The method of claim 10, wherein the sensor includes a camera capturing a sequence of images depicting a body part of the user and wherein the dynamic balancing parameters are determined by measuring movement of the body part depicted in the sequence of images.

20. The method of claim 19, wherein the body part of the user is selected from a group consisting of a knee, leg, foot, ankle, lower leg, upper leg and hip.

* * * * *